J. SHERRILL.
Cultivators.
No. 134,615. Patented Jan. 7, 1873.
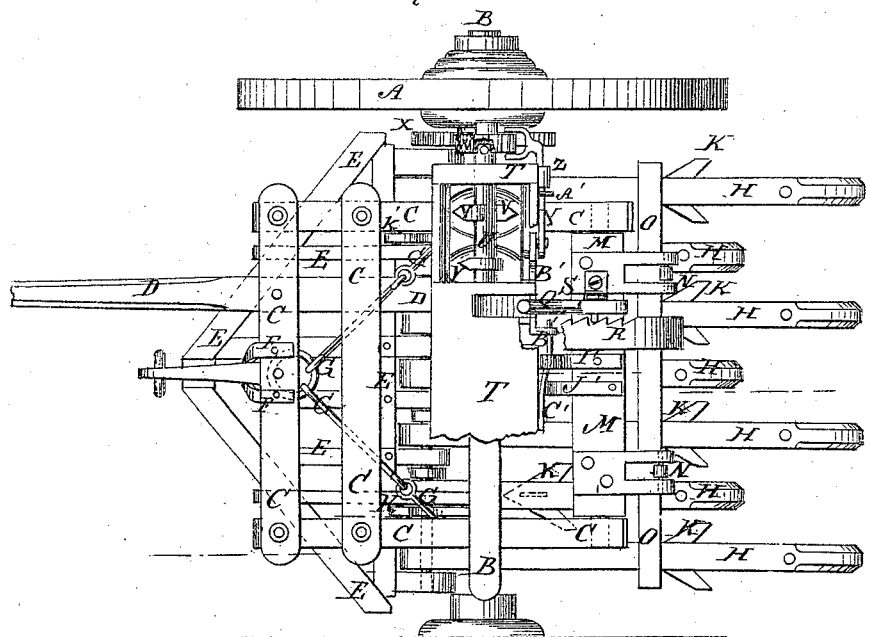
Fig. 1
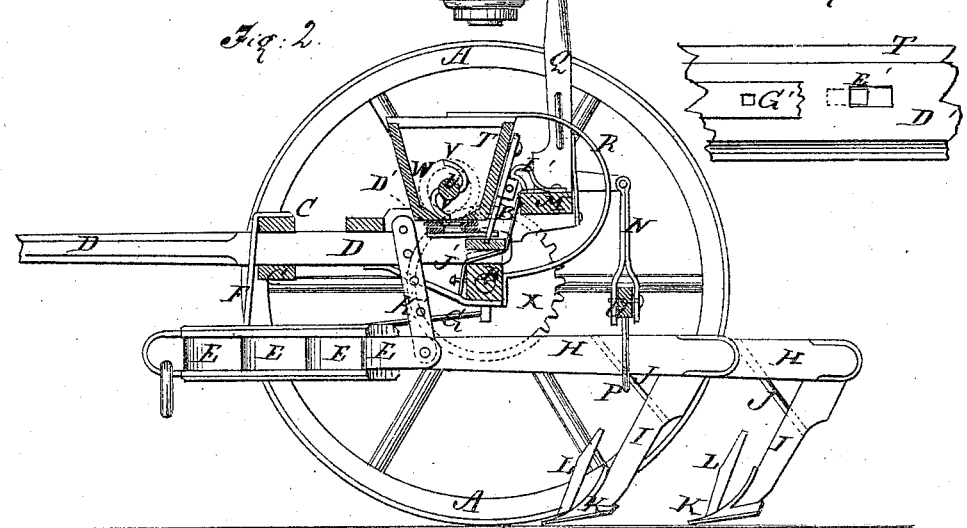
Fig. 2
Fig. 4
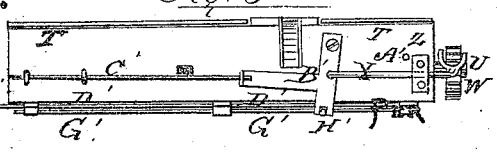
Fig. 3
Witnesses:
Chas. Nida
C. Sedgwick
Inventor:
J. Sherrill
Attorneys.

UNITED STATES PATENT OFFICE.

JAMES SHERRILL, OF HARRISBURG, OREGON.

IMPROVEMENT IN CULTIVATORS.

Specification forming part of Letters Patent No. 134,615, dated January 7, 1873.

*To all whom it may concern:*

Be it known that I, JAMES SHERRILL, of Harrisburg, in the county of Linn and State of Oregon, have invented a new and useful Improvement in Combined Seed-Sower and Cultivator, of which the following is a specification:

Figure 1 is a top view of my improved machine, parts being broken away to show the construction. Fig. 2 is a detail vertical section of the same. Fig. 3 is a detail rear view of the seed-box detached. Fig. 4 is a detail view of a portion of the bottom of the seed-box, part being broken away to show the construction.

Similar letters of reference indicate corresponding parts.

My invention has for its object to furnish an improved seed-sower and cultivator, simple in construction, convenient in use, and effective and reliable in operation; and it consists in the construction and combination of various parts of the machine, as hereinafter more fully described.

A represents the wheels, which revolve upon the axles of the axle-tree B, to which the stationary frame C is attached. D is the tongue, which is attached to the frame C, and which may be placed at the center of said frame or toward one side, as may be desired, according to the number of horses to be used abreast. E is a triangular frame, to the forward part or angle of which the draft-clevis is attached. The frame E consists of a number of parallel bars of different lengths connected and held in their proper relative positions by cross-bars attached to their ends. The forward part or angle of the frame E is connected with the forward part of the stationary frame C by a strap or straps, F, the lower ends of which are attached to the said part or to the draft-clevis, and their upper ends are attached to the forward part of the stationary frame C. G are chains or jointed rods, the rear ends of which are attached to the axle B, and their forward ends are attached to the forward part or angle of the said frame E or to the draft-clevis, so that the carriage may be drawn from the frame E. H are the plow-beams, of which I prefer to use seven, of different lengths, four longer and three shorter, arranged alternately, as shown in Fig. 1. The forward ends of the plow-beams H are placed between the rear ends of the parallel bars of the frame E, to which they are pivoted by a long bolt or rod, washers being used, if necessary, to prevent the beams H from having any lateral play while allowing the rear parts of the said beams to have a free vertical movement. To the rear ends of the plow-beams H are attached the upper ends of the standards I, the draft strain upon which is sustained by the brace-rods J. T is the seed-box, which is attached to the frame C directly over the axle B. In the bottom of seed-box T is formed a series of holes, which are arranged directly over the plow-beams H, so that the seed in falling may strike upon said beams and be thoroughly scattered. The bottom of the seed-box T is concaved or recessed around the discharge-openings, as shown in Figs. 1 and 2, so that the seed may pass readily to the said openings. U is a shaft extending longitudinally through the seed-box T, and revolving in bearings in the ends of the said box. Upon the projecting end of the shaft U is placed a small gear-wheel, W, which is connected with said shaft by a tongue and groove or other suitable means, so that it may carry the said shaft with it in its revolution, but may slide freely upon the said shaft to be thrown into and out of gear with the gear-wheel X, when desired. The gear-wheel X is securely attached to the wheel A so as to be carried with the said wheel in its revolution. Y is a rod which passes through a keeper, Z, attached to the rear side of the seed-box T near its end. The outer end of the rod Y is bent forward, and is forked to receive the gear-wheel W and serve as a clutch for moving the said gear-wheel into and out of gear. The keeper Z is made long, so that the outer end of the rod Y may be raised away from the gear-wheel W to allow the said gear-wheel W to be removed from the shaft U when the dropping device is not required to be used. The rod Y is held down in the lower part of the keeper Z by a screw or pin, A', as shown in Figs. 1 and 3. The inner end of the rod Y is pivoted to a cross-head lever, B', which is pivoted to the rear side of the seed-box T. The lever B' is also pivoted to the end of a spring-rod, C', the other end of which is attached to the rear side of the seed-box T. D' is a sliding plate placed upon the under side of the bottom of the seed-box T, and which is slotted longitudinally beneath each discharge-opening. To the bottom of the seed-box T, at one side of and slightly overlapping each discharge-opening, and within the slots of the sliding plate D', are secured small plates E', as shown in Fig. 4, so that by adjusting the said sliding plate D' the size of the discharge-openings may be readily adjusted according as less or more seed is required to be sown. The sliding plate D' is adjusted to regulate the discharge by a screw, F', connected with its end, as shown in Fig. 3. G' is a sliding plate placed upon the outer or lower side of the plate D', and having holes formed in it corresponding with the holes of the bottom of the seed-box T. To the plate G is attached, or upon it is formed, an arm, H', the outer end of which is connected with the cross-head lever B', so that when the said lever is operated to throw the gear-wheel W out of and into gear the same movement may operate the sliding plate G' to close or open the discharge-openings of the seed-box T.

The depth to which the plows enter the ground may also be limited by the bars K', through the lower ends of which passes the long bolt or rod that pivots the forward ends of the plow-beams H to the frame E. The upper ends of the bars K' are connected with the stationary frame C by pins or bolts which pass through holes in the side bars of said frame and in the said bars K', several holes being formed in the said bars to receive the said pins or bolts, so that the forward ends of the plow-beams may be raised and lowered as may be desired.

Having thus described my invention, I claim as new and desire to secure by Letters Patent—

1. The forked or clutch rod Y, cross-head lever B', spring-rod C', arm H', and catch I', in combination with the seed-box T, gear-wheel W, sliding plate G', and roller M, substantially as herein shown and described, and for the purposes set forth.

2. The draft-frame E, pendent from stationary frame and axle, and having the plow-beams pivoted thereto, as and for the purpose described.

JAMES SHERRILL.

Witnesses:
S. MAY,
R. A. RAMPY.